United States Patent

[11] 3,625,923

[72] Inventor Rene Marie-Joseph Roberts
Charleston, W. Va.
[21] Appl. No. 842,381
[22] Filed July 16, 1969
[45] Patented Dec. 7, 1971
[73] Assignee Union Carbide Corporation
New York, N.Y.

[54] PROCESS FOR PRODUCING CROSSLINKED POLYAMIDES FROM LACTAMS
2 Claims, No Drawings

[52] U.S. Cl. .................................................. 260/78 L
[51] Int. Cl. ............................................... C08g 20/10
[50] Field of Search ..................................... 260/78 L

[56] References Cited
UNITED STATES PATENTS
2,832,757 4/1958 Munch et al. .................. 260/78 L FOREIGN PATENTS
6,606,079 11/1967 Netherlands ................. 260/78 L OTHER REFERENCES
Chemical Abstracts, Vol. 68, No. 12, March 18, 1968, pg. 4895, QO1A51

Primary Examiner—Harold D. Anderson
Assistant Examiner—L. M. Phynes
Attorneys—Paul A. Rose, Louis C. Smith, Jr. and Francis M. Fazio

ABSTRACT: Cross-linked polyamides are produced by the noncatalytic polymerization of a lactam and a bis-lactam. The polyamides have known utilities.

PROCESS FOR PRODUCING CROSSLINKED POLYAMIDES FROM LACTAMS

This invention relates to a noncatalytic method of producing cross-linked polyamides from a lactam and a bis-lactam.

The catalytic polymerization of lactams is well-known. However, it has not heretofore been possible to polymerize a lactam in the absence of a catalyst, water or other additive. It has, consequently, been expected that bis-lactams would act in a similar manner.

It has now been found that a mixture of lactum and bis-lactam will polymerize in the absence of catalyst or water. This find was completely unexpected and unobvious.

The lactams are known, and those suitable for use in this invention are the unsubstituted and substituted lactams of the formula:

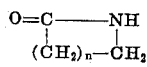

wherein n has a value of from one to about 16 or more and the substituents can be alkyl, aryl, alkaryl, aralkyl, amino, carboxyl, cyano or any other group that will not unduly interfere with the polymerization reaction.

Illustrative of the lactams which may be employed one can mention beta-propiolactam, gamma-butyrolactam, delta-valero-lactam, epsilon-caprolactam, laurolactam, stearolactam, N-methyl-epsilon-caprolactam, alpha-aminocaprolactam and the like.

Similarly the bis-lactams are known; these have the general formula:

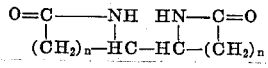

Illustrative thereof one can mention bis(beta-propio-lactam), bis(gamma-butyrolactam), bis(delta-valerolactam), bis-(epsilon-caprolactam), bis-laurolactam, bis-stearolactam, bis(N-methyl-epsilon-caprolactam), bis-alpha-aminocaprolactam), and the like.

In the process of this invention a mixture of lactam and bis-lactam containing about 10 weight percent, or more, of the bis-lactam is polymerized by heating in the absence of any appreciable amount of water or catalyst. The bis-lactam can be as much as 90 percent of the reaction mixture. In the process a single lactam and bis-lactam can be used in the reaction mixture to produce the polyamide copolymers or one can use two or more lactams and/or bis-lactams in the reaction.

The conventional methods for polymerizing a lactam to a polyamide can be used. These are well known and need not be described in detail here. In these methods, the reaction mixture is heated, preferably in an inert gas atmosphere to prevent undesired side reactions, at polycondensation temperatures of from about 200° C. or less, to about 300° C. or more.

The polymers produced have better properties than the unmodified polyamides heretofore obtained from the lactams. Further, their structural composition is different as established by differential thermal analysis.

In a typical reaction 10 grams of epsilon-caprolactam and 1 gram of 7,7'-bis(epsilon-caprolactam) were placed in a heavy-walled tube. The tube contents were purged with nitrogen for ten minutes and the tube was sealed. The tube was heated in an oil bath maintained at 250° C. for six hours. It was then removed from the bath, cooled to room temperature and broken open. The copolyamide was crushed, extracted with boiling distilled water in a Soxhlet extractor for six hours and dried at 90° C. under vacuum (Copolyamide I). When an attempt was made to polymerized epsilon-caprolactam alone, without any catalyst or water present, we did not obtain any polymer.

For comparative purposes a polyamide was produced in the same manner using the same epsilon-caprolactam and water as the initiator but without 7,7'-bis(epsilon-caprloactam) in the reaction mixture (Polyamide II).

The copolyamide (Copolyamide I) produced by the process of this invention did not dissolve when heated for 10 minutes at 90° C. in concentrated sulfuric acid; whereas, the comparative polyamide (Polyamide II) dissolved readily. Further, differential thermal analysis on the two samples showed no crystalline melting point for the copolyamide and a sharp peak at 215° C. to 230° C. for the polyamide comparative sample.

Similarly, copolyamides are produced from the following combinations of lactams and bis-lactams, the parenthetical figures are parts by weight.

| Copolyamide | Lactam | Bis-lactam |
|---|---|---|
| A | epsilon-caprolactam (80) | bis(beta-propiolactam) (20) |
| B | epsilon-caprolactam (70) beta-propiolactam (15) | bis(epsilon-caprolactam) (15) |
| C | delta-valerolactam (60) | bis(delta-valerolactam) (40) |
| D | laurolactam (75) | bis-laurolactam (25) |
| E | stearolactam (70) | bis(epsilon-caprolactam) (30) |
| F | epsilon-caprolactam (50) | bis-stearolactam (50) |

What is claimed is:

1. A noncatalytic method for producing cross-linked copolyamides which comprises reacting a mixture of (i) a lactam of the formula:

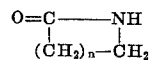

and (ii) from 10 to 90 weight percent of a bis-lactam of the formula:

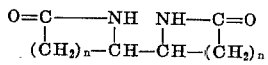

at a polycondensation temperature of from about 200° to about 300° C.; n being an integer having a value of 1 to about 16.

2. The method of claim 1 wherein the lactam is epsilon-caprolactam and the bis-lactam is bis(epsilon-capolactam).